Oct. 6, 1953     R. W. WILSON     2,654,304
HITCH FOR HEAVY IMPLEMENTS
Filed Jan. 11, 1952     3 Sheets-Sheet 1
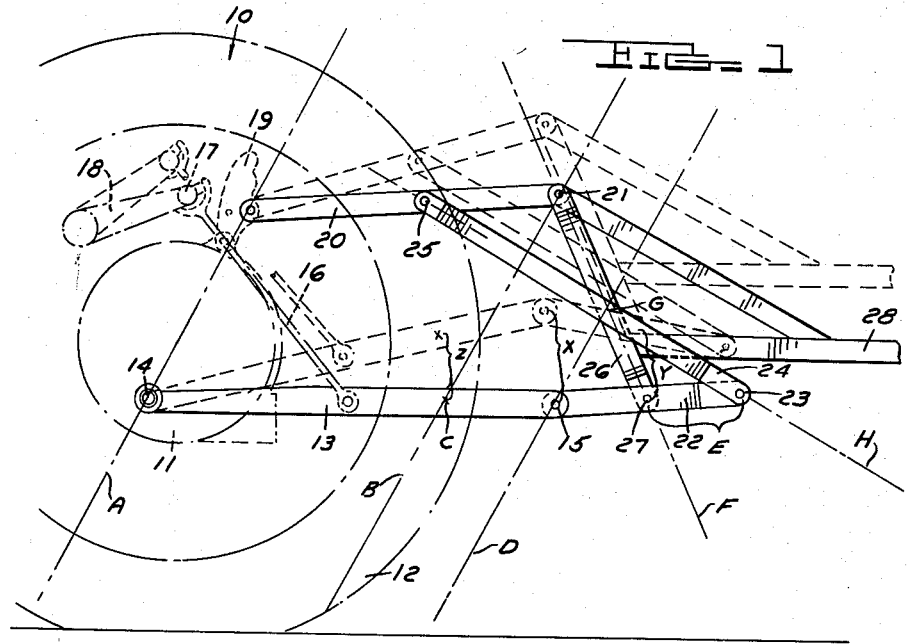
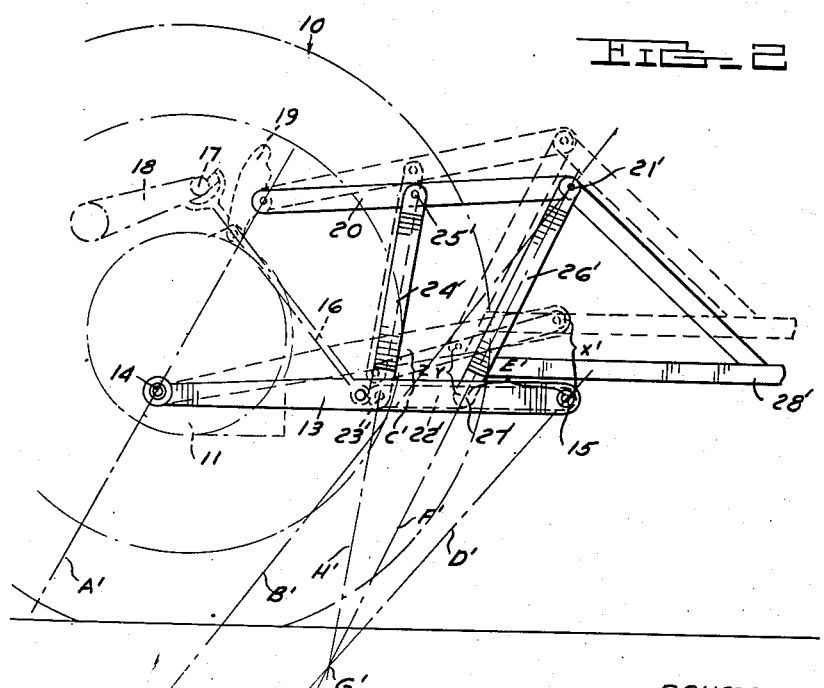
INVENTOR.
RAYMOND W. WILSON
BY
H. P. Settle, Jr.
ATTORNEYS

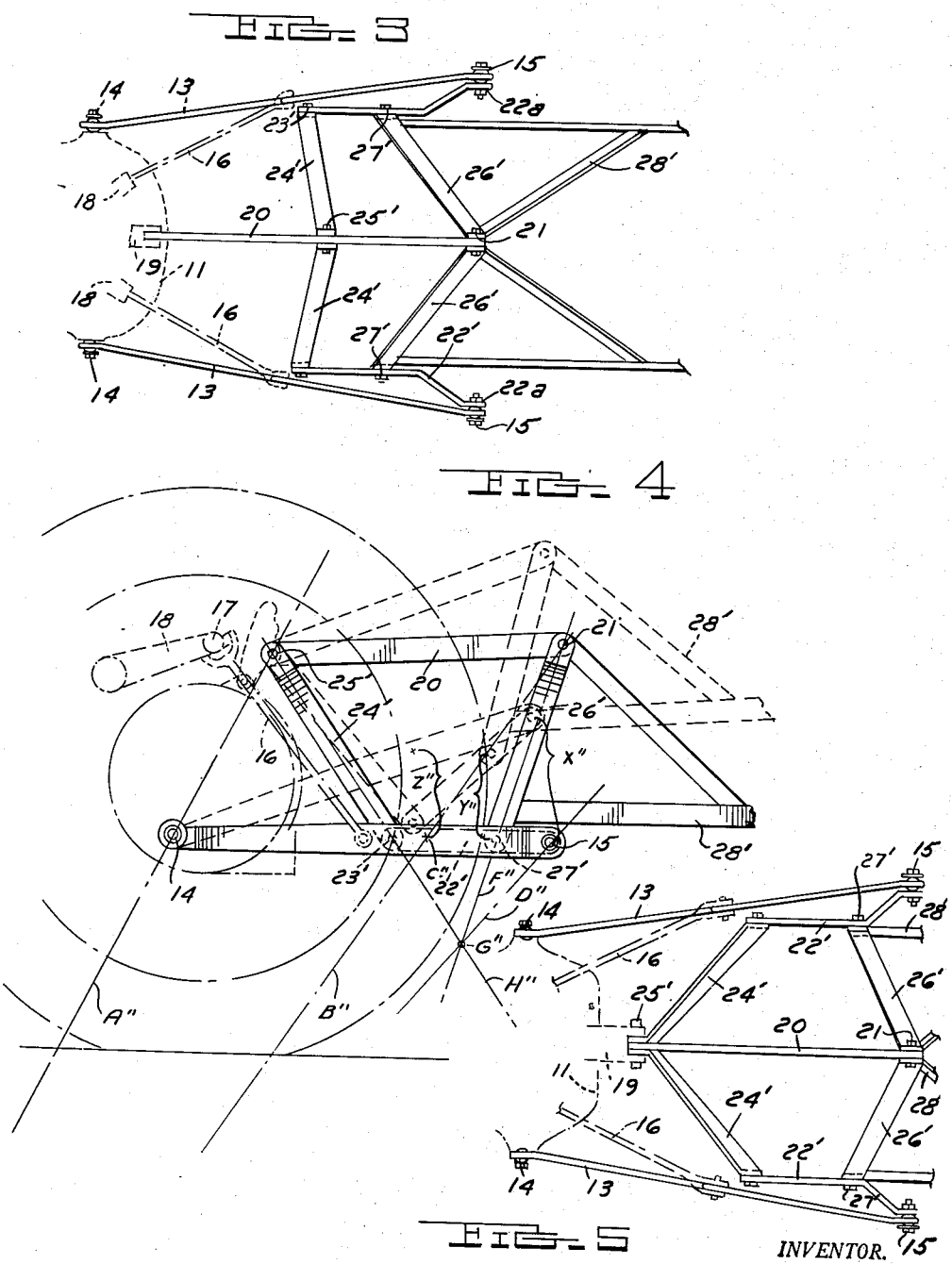

Oct. 6, 1953  R. W. WILSON  2,654,304
HITCH FOR HEAVY IMPLEMENTS
Filed Jan. 11, 1952  3 Sheets-Sheet 3

INVENTOR.
RAYMOND W. WILSON
BY *WM Schaich*
AND *HP Settle, jr.*
ATTORNEYS

Patented Oct. 6, 1953

2,654,304

UNITED STATES PATENT OFFICE 2,654,304

HITCH FOR HEAVY IMPLEMENTS

Raymond W. Wilson, Ferndale, Mich., assignor to Dearborn Motors Corporation, Birmingham, Mich., a corporation of Delaware Application January 11, 1952, Serial No. 265,965

7 Claims. (Cl. 97—47.62)

The present invention relates to an implement hitch and more particularly to a hitch linkage wherein the lifting capacity of the linkage is increased by power lifting the linkage through a vertical distance greater than the corresponding distance through which the implement is elevated thereby.

In recent years, the use of tractor mounted, trailing, power-liftable hitch linkages has greatly increased, particularly in connection with relatively light tractors. This type of linkage is utilized to elevate various implements from working positions to transport positions and also to control the operation of the implement in accordance with the draft forces generated during such operation. In the transporting and operational control of relatively heavy and/or longitudinally extended implements, such as tandem disc harrows, offset disc harrows, or the like, more or less definite size and weight limitations have been imposed by the lifting capacity of the linkage and the commonly associated hydraulic actuating means. The present invention provides means whereby the effective lifting capacity is increased without modification of the tractor-mounted linkage elements or of the linkage actuating mechanism.

The hitch of the present invention obtains this increase of lifting capacity through linkage elements mounted upon the implement, thus avoiding impairment of the broad usefulness of the tractor-mounted linkage elements, and without increasing the power output of the actuating system, which is adequate for the great majority of tractor uses. Actually, the effective lifting capacity increase is obtained by sacrificing a predetermined portion of the conventional implement lift height. The specific hitch arrangement for accomplishing this result is variable, although in each case the tractor-mounted linkage elements are elevated through a distance greater than the distance of implement elevation. In other words, the implement is elevated as though it were connected to an effective hitch point located forwardly of its point of actual connection to the tractor-mounted linkage elements.

In a three-point tractor-mounted linkage arrangement, as in the well-known Ford tractor, the lower laterally spaced link elements are power liftable and an upper compression link element is provided laterally intermediate the lower links. The upper link element is not power liftable, but is elevated by its connection to the lower link elements through the implement frame. The top link is operatively connected to the implement frame to stabilize the frame and to control the extent of differential vertical movement of the implement frame relative to the lower power liftable link elements upon elevation of the lower links to a transport position, thereby increasing the weight lifting capacity of the linkage as hereinbefore explained.

It is, therefore, an important object of the present invention to provide an implement hitch for heavy implements whereby a relatively light tractor having a power actuated hitch linkage may be utilized for the elevation and working control of implements heavier than those normally useable therewith.

Another important object is the provision of an implement hitch wherein the effective lifting capacity of the hitch is increased by means of a linkage which is power-liftable through a vertical distance greater than the corresponding distance through which an implement carried by the linkage is elevated.

It is a further important object to provide a hitch linkage wherein the weight lifting capacity of the linkage is increased by decreasing the conventional implement lift height while concurrently elevating power-liftable portions of the linkage through a distance greater than that through which an implement carried thereby is elevated.

Still another object is the provision of a three-point tractor-mounted linkage wherein normally forwardly convergent upper and lower link elements are utilized to carry an implement with the upper link being connected to the frame to control the extent of relative angular movement of the implement and the link elements to accommodate a lifting of relatively heavy implements.

The specific nature of this invention, as well as other objects and advantages thereof, will become apparent to those skilled in the art from the following detailed description taken in conjunction with the attached drawings on which, by way of preferred example only, are illustrated several embodiments of this invention.

On the drawings:

Figure 1 is a side elevational view of an implement hitch of the present invention;

Figure 2 is a side elevational view of a modified form of hitch linkage of the present invention;

Figure 3 is a plan elevational view of the linkage of Figure 2;

Figure 4 is a side view of still another modified form of hitch linkage of the present invention; and Figure 5 is a plan view of the hitch of Figure 4.

As shown on the drawings:

Figure 1A:
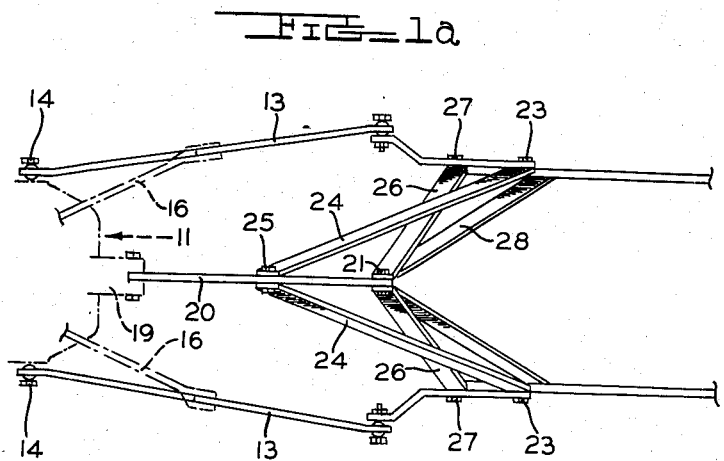
Figure 1(a) is a plan view of the hitch of Figure 1.

In Figure 1, reference numeral 10 refers generally to a tractor of which only the rear axle housing 11 and one of the rear wheels 12 is shown. The tractor 10 is provided with a three-point linkage of the type generally utilized with the well-known Ford tractor and including a pair of laterally spaced trailing hitch links 13 pivotally connected, as at 14, to the underside of the rear axle housing and terminating in ball-type universal connection bearings 15. The lower link elements 13 intermediate their length are pivotally connected to upwardly extending lift arms 16 which are pivoted, as at 17, to the free ends of corresponding rock arms 18 adapted to be energized by a conventional tractor-mounted hydraulic system to control the positioning of the lower links 13. The tractor rear axle housing 11 is surmounted by a control bracket 19 pivotally connected to a rearwardly extending top link 20 provided at its rear end with a universally pivoted connecting means 21.

The lower link elements 13 are each connected to a rearwardly extending arm 22 pivotally connected to the attachment bearings 15 at the rear ends of the lower links and extending rearwardly therefrom in substantial alignment therewith for connection at their extreme ends, as at 23, to upwardly and forwardly extending link members 24 pivotally connected at 25 to the top link 22 intermediate the length thereof. Since the top link 20 is above and laterally intermediate the lower links 13, the members 24 are upwardly and forwardly convergent toward the top link. Implement frame elements 26 are adapted to be pivoted at their upper ends to the attachment point 21 of the top link 20 and at their lower ends, as at 27, to an intermediate portion of each of the arms 22. Since the pair of frame members 26 are provided, the members 26 are forwardly convergent to form an implement A-frame rigidly carrying a rearwardly extending implement beam 28.

The location of the implement frame upon the linkage is determined in the following manner:

Line A connecting the points of attachment of the linkage elements 13 and 20 to the tractor is first constructed and extended downwardly and forwardly as illustrated. Next, a line B is drawn through the point 21 which is the point of connection between the top link 20 and the implement frame elements 26 and the point C which is the desired lower link hitch point about which the implement beam 28 will be effectively moved upon power elevation of the linkage. In the illustrated example, the point C is located so that lines A and B are parallel. A line D is next constructed through the attachment point 15 at the rear end of the lower links 13 and a convenient lever arm length is chosen and extended rearwardly of the connection point 15 to obtain the length of the lever arm 22. Line F is next drawn to connect the top link connection point 21 to an intermediate point 27 along the length of the lever arm 22, this line F determining the location of the implement frame member 26 and the length of lever arm E. It will be noted that the line F intersects the line D at point G and the line H is next constructed to connect the point 23 at the rear end of the lever arm 22 and the point G, with the line H being extended forwardly and upwardly to determine the location of the point 25 at which the control arm 24 is connected to the top link 20.

As may be best seen in dotted outline in Figure 1, the power lifting of the lower links 13 by actuation of the rocker arms 18 will result in elevation of the point 15 through a given distance X.

The extreme rear end of the top link will be raised by the implement frame, and the connection point 25 along the length of the top link 20 will be elevated to a lesser degree by virtue of the fixed pivot point at the forward end of the top link. The control arms 24, being of constant length, will be elevated to the same extent as the point 25, so the rear ends of the arms 22 are elevated less than the medial portions thereof carrying the implement frame. Further, upon elevation of the lower links, the control arms 24 are subjected to a tension load restraining the lever arms 22 against pivotal movement about the points 15, and the elevation of the lower links necessarily causes elevation of the lever arms 22. Since the lever arms are pivotal relative to the lower links, the points 27 and the implement frame will be moved through a distance Y upon elevation of the lower link points 15 through the distance X, the distance Y being less than the distance X due to depression of the end of the lever arms by the control arms 24, as hereinbefore described. Inasmuch as the line D is parallel to the line B and the extent of depression of the lever arm is determined by the control arm line H intersecting lines D and F at G, the distance X is very closely approximate to the distance Z through which the effective hitch point C is elevated upon movement of points 15 through distance X. Consequently, upon elevation of the lower links 13, the implement frame members 26 will be elevated as though they were connected to the lower links 13 at the point C.

From the foregoing description it will be appreciated that the implement frame elements 26 have been elevated only through the distance Y which is less than the distance X, and since the total lifting force available remains unchanged, it will be possible for a greater weight of implement connected to the frame members 26 to be elevated. The point 27, the hitch point to which the implement frame 26 is actually connected, is similarly elevated through a distance equal to the distance Y through which the top link has been elevated. Thus, in effect the linkage causes elevation of the frame as though the implement frame were connected to the point C and to a corresponding point on the top link 20. The advantages of the present invention reside in the fact that it is not necessary to shorten the lower line 13 so that an actual connection to the point C is obtained. It will be appreciated that the effective hitching to the point C results in the lifting of heavier implements since the power lifting mechanism of the tractor, including the rock arms 18 and the lift arms 16, acts through a shorter lever arm. Thus, the present invention gives the effect of shorter lift links with the resultant increased lifting capacity and correspondingly decreased height of lift.

In the embodiment of Figure 2, prime numerals identical with those of Figure 1 are utilized to identify functionally identical portions of the structure. The lines of construction A through H in Figure 2 are slightly different and are designated as A' through H'.

In the modified linkage of Figure 2, the lower links 13 are connected at their rear ends, as at the connection points 15, to the lever arms 22'. The actual connection 22a (Figure 3) is made by an elongated pin, and the arms 22" are offset and extend forwardly from the point 22a laterally between the lower links 13. The implement frame elements 26' are connected between the rear end 21 of the top link 20 and intermediate portions 27' of the lever arms 22'. The free forward ends of the lever arms 22 are connected to control arms 24' which project upwardly for connection at 25' to an intermediate portion of the top link 20.

The dimensional derivation of the link elements is also illustrated in Figure 2 and includes the construction of a first line A' connecting the points of attachment of the links to the tractor. Line B' is constructed through the point 25 at the rear of the top link 20 and the chosen point C' constituting the desired effective hitch point as hereinbefore explained. Line D' is constructed from the point of intersection of the line A' and B' through the point 15 at the rear extremities of the lower link elements 13. Next, a convenient lever arm length 22' is laid off along the length of the lower link 13 and line F' connecting the point 27' and the point 21 is constructed, this line F' intersecting the line D' at the point G'. The distance E' between points 15 and 27' denotes the lever arm effective to elevate the implement frame. Finally, the line H' is connected from the point of intersection G' through the inner extremity of the arm 22' to determine the point 25' to which the upper extremity of the control arm 24' is connected.

Thus, the linkage illustrated in Figure 2 is constructed to obtain the differential lifting length reflected in the differences of elevation X' of the lower link and the distance Y' constituting the elevation of the implement frame, with the implement frame distance of elevation Y again approximately equaling the height of elevation of the effective hitch point C', this latter dimension being indicated at Z.

The operation of the linkage of Figure 2 is essentially the same as that of the linkage of Figure 1, since again the differential lifting gives the effect of connecting the implement frame 26 at the effective hitch point C'.

In the embodiment of Figures 4 and 5, reference numerals identical with those of Figure 2 are utilized to identify identical portions of the structure. The lines of construction A through H in Figure 2 are slightly different and are designated as A" through H".

In this embodiment of the present invention, the control arm 24' is again connected, as at 23, to the forward end of the lever arm 22', but the upper extremity of the control arm 24' is connected, as at 25', to the forward extremity of the top link 20. Otherwise, the linkage is quite similar to that of Figure 2 and the general construction of the linkage is similar to that hereinbefore described. Due to the fact that the control arm 24' is connected at the forward end of the top link 22 and thus is fixed relative to the tractor, an even greater pitch of the implement beam is obtained upon power elevation of the linkage. This greater pitch is indicated by the extreme angle through which the lever arm 22 is moved upon elevation of the linkage while the same advantages of greater lifting capacity are obtained. To derive the structure of Figures 4 and 5, lines A", B", D" and F" are constructed as described in connection with the corresponding lines of Figure 1. Then, line H" is constructed to connect the point G" with the point of connection of the top link to the control bracket 19. The intersection of line H" with the longitudinal axis of the link 13 determines the lengths of lever arms 22 so that control arm 24' is connectable to the forward end of the top link 20.

From the foregoing description of the three illustrated embodiments of the present invention, it will be evident that the present invention provides a new and novel hitch linkage whereby the lifting capacity of the linkage is increased while retaining the standard tractor-mounted linkage elements, without changing the actuating mechanism for the linkage, and without impairing the suitability of the linkage and associated actuating mechanism for use with other implements. The increased lifting capacity is obtained by means of the linkage in such a manner that the implement is elevated as though it were connected to the tractor through an implement hitch element of substantially shorter length. The linkage obtains this result by the interconnection of the top link and a lever arm at a plurality of longitudinally spaced points, so that the implement frame is elevated to approximately the same extent as the effective hitch point.

It will, of course, be understood that many details of construction may be varied through a wide range without departing from the principles of this invention and it is, therefore, not the purpose to limit the patent granted hereon otherwise than necessitated by the scope of the appended claims.

I claim:

1. An implement hitch for a tractor comprising a pair of laterally spaced trailing draft links pivotally connectable to said tractor, a trailing top link adapted for attachment to said tractor, a lever arm pivotally secured to the trailing end of each of said lower links, an implement frame connected at its upper end to said top link and to said lever arms intermediate their lengths, and control arms connected to said top link in spaced relationship to said implement frame and to the free ends of said lever arms, power lifting of said lower links effecting pivoting movement of said lever arms with movement of the free ends of said lever arms restricted by said control arms, so that said implement frame is power lifted through a distance less than the distance through which the free ends of said lower links are elevated.

2. An implement hitch for tractors comprising trailing upper and lower link elements forwardly convergent in a vertical plane, said lower links being power liftable, lever arms connected to the trailing ends of said lower links and normally longitudinally aligned therewith, an implement frame connected to said top link and to said lever arms, and control arms connected to said top link in spaced relation to said implement frame and to said lever arms, said control arms being effective to limit elevation of the portions of said lever arms to which said control arms are connected upon lifting of said lower links to limit the lifting of said implement frame through said lever arms to a vertical distance less than the distance through which the free ends of said lower links are raised.

3. An implement hitch for a tractor comprising triangularly arranged trailing hitch links on the tractor, including a pair of power liftable lower links and an independently movable upper link, a lever arm pivotally connected to the trailing end of each of said lower links and longitudinally aligned therewith, an implement frame pivoted to an intermediate portion of said lever arm and to the trailing end of said top link, and a control arm pivotally secured to said top link intermediate its length and to said lever arm in spaced relation to said implement frame, said implement frame being effective to elevate said top link upon power lifting of said lower links and said control arm being movable with said top link to restrict movement of said lever arm, so that said implement frame is elevated to a lesser extent than said lower links, whereby the linkage is effective to elevate a relatively heavy load through a relatively short distance.

4. In an implement hitch for a tractor having laterally spaced trailing pivotal power-liftable lower links and a trailing top link, a lever arm attachable at one end to each of said lower links for substantial alignment therewith and for independent pivotal movement relative thereto, a rigid implement A-frame having its upper portion connectable to said top link at the trailing end thereof and downwardly divergent side portions pivoted adjacent their lower extremities to the associated lever arm intermediate the lengths thereof, and downwardly divergent control arms having corresponding ends pivotally connectable to said top link forwardly of said top link connection to said A-frame and having their other corresponding ends respectively pivoted to the free ends of said lever arms, whereby elevation of said lower links will effect pivoting movement of said lever arms relative to said lower links by depression of the free ends thereof under the control of said control arms to thereby elevate said implement A-frame to a lesser extent than said lower links.

5. The combination defined in claim 4, wherein said lever arms are adapted to extend rearwardly of said lower links and said control arms are connectable intermediate the length of said upper link.

6. The combination defined in claim 4, wherein said lever arms are adapted to extend forwardly of said lower links and said control arms are connectable intermediate the length of said upper link.

7. The combination defined in claim 4, wherein said lever arms are adapted to extend forwardly of said lower links and said control arms are connectable at the forward extremity of said upper link.

RAYMOND W. WILSON.

References Cited in the file of this patent

UNITED STATES PATENTS

| Number | Name | Date |
|---|---|---|
| 2,312,258 | Martin | Feb. 23, 1943 |
| 2,337,801 | Cook | Dec. 28, 1943 |
| 2,437,879 | Ferguson | Mar. 16, 1948 |
| 2,456,693 | Fraga | Dec. 21, 1948 |